US012267663B2

(12) United States Patent
Kulavik

(10) Patent No.: US 12,267,663 B2
(45) **Date of Patent: *Apr. 1, 2025**

(54) METHOD AND SYSTEM FOR SURROUND SOUND PROCESSING IN AN AUDIO DEVICE

(71) Applicant: Voyetra Turtle Beach, Inc., White Plains, NY (US)

(72) Inventor: Richard Kulavik, San Jose, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 281 days.

This patent is subject to a terminal disclaimer.

(21) Appl. No.: 17/957,441

(22) Filed: Sep. 30, 2022

(65) Prior Publication Data

US 2023/0033891 A1 Feb. 2, 2023

Related U.S. Application Data

(63) Continuation of application No. 17/123,755, filed on Dec. 16, 2020, now Pat. No. 11,503,420, which is a (Continued)

(51) Int. Cl.

*H04S 3/00* (2006.01)
*H04R 5/033* (2006.01)
*H04S 5/00* (2006.01)

(52) U.S. Cl.

CPC .............. *H04S 3/004* (2013.01); *H04R 5/033* (2013.01); *H04S 5/005* (2013.01); *H04S 2400/01* (2013.01)

(58) Field of Classification Search

CPC ...... H04S 3/004; H04S 5/005; H04S 2400/01; H04R 5/033

(Continued)

(56) References Cited

U.S. PATENT DOCUMENTS

| | | | |
|---|---|---|---|
| 6,053,814 | A | 4/2000 | Pchenitchnikov |
| 6,188,439 | B1 | 2/2001 | Kim |

(Continued)

FOREIGN PATENT DOCUMENTS

| | | |
|---|---|---|
| EP | 2979359 | 2/2016 |
| WO | 98/42127 | 9/1998 |
| WO | 2012172480 | 12/2012 |

OTHER PUBLICATIONS

Int'l Search Report and Written Opinion for PCT/US2014/049687 dated Nov. 18, 2014.

(Continued)

*Primary Examiner* — Vivian C Chin
*Assistant Examiner* — Con P Tran
(74) *Attorney, Agent, or Firm* — McAndrews, Held & Malloy, Ltd.

(57) ABSTRACT

An audio headset may receive a plurality of audio signals corresponding to plurality of surround sound channels. The headset may determine, via its audio processing circuitry, context and/or content of the audio signals. The audio processing circuitry may process the audio signals to generate stereo signals carrying one or more virtual surround channels, wherein the processing comprises automatically controlling, based on the context and the content of the audio signals, a simulated acoustic environment of the virtual surround channels.

22 Claims, 12 Drawing Sheets

Related U.S. Application Data continuation of application No. 16/871,463, filed on May 11, 2020, now Pat. No. 10,880,665, which is a continuation of application No. 16/353,565, filed on Mar. 14, 2019, now Pat. No. 10,652,682, which is a continuation of application No. 15/659,161, filed on Jul. 25, 2017, now Pat. No. 10,237,672, which is a continuation of application No. 14/449,236, filed on Aug. 1, 2014, now Pat. No. 9,716,958.

(60) Provisional application No. 61/888,586, filed on Oct. 9, 2013.

(58) Field of Classification Search
USPC ....... 381/309, 310, 311, 300, 19, 74, 61, 17, 381/375, 374, 370, 382, 122, 18, 307, 26, 381/384, 182; 463/39; 455/575.2, 90.1; 700/94
See application file for complete search history.

(56) References Cited

U.S. PATENT DOCUMENTS

| | | | |
|---|---|---|---|
| 6,614,912 | B1 | 9/2003 | Yamada et al. |
| 7,136,712 | B2 | 11/2006 | Mizumura et al. |
| 7,976,385 | B2 | 7/2011 | Riggs |
| 8,979,658 | B1 | 3/2015 | Kulavik |
| 9,067,135 | B2 | 6/2015 | Kulavik |
| 2002/0094865 | A1 | 7/2002 | Araki et al. |
| 2002/0161586 | A1 | 10/2002 | Wang |
| 2003/0007648 | A1 | 1/2003 | Currell |
| 2004/0136538 | A1 | 7/2004 | Cohen et al. |
| 2005/0117761 | A1 | 6/2005 | Sato |
| 2006/0120533 | A1 | 6/2006 | Chen |
| 2008/0009332 | A1 | 1/2008 | Kake |
| 2008/0240458 | A1 | 10/2008 | Goldstein et al. |
| 2008/0318518 | A1 | 12/2008 | Coutinho et al. |
| 2009/0147975 | A1 | 6/2009 | Horbach et al. |
| 2009/0232317 | A1 | 9/2009 | Emerit et al. |
| 2009/0252337 | A1 | 10/2009 | Chen et al. |
| 2009/0252355 | A1 | 10/2009 | Mao |
| 2009/0304214 | A1 | 12/2009 | Xiang et al. |
| 2010/0040240 | A1 | 2/2010 | Bonanno |
| 2011/0135098 | A1 | 6/2011 | Kuhr et al. |
| 2012/0014553 | A1 | 1/2012 | Bonanno |
| 2012/0213375 | A1 | 8/2012 | Mahabub et al. |
| 2013/0041648 | A1 | 2/2013 | Osman |
| 2014/0073429 | A1* | 3/2014 | Meneses ............... A63F 13/215 463/35 |
| 2014/0133683 | A1* | 5/2014 | Robinson ................ H04S 7/305 381/303 |
| 2015/0098575 | A1 | 4/2015 | Kulavik et al. |
| 2015/0098603 | A1 | 4/2015 | Kulavik et al. |

OTHER PUBLICATIONS

Int'l Search Report and Written Opinion for PCT/US14/54060 dated Dec. 18, 2014.

Int'l Search Report and Written Opinion for PCT/US2014/059691 dated Jan. 7, 2015.

European Office Communication with Extended European Search Report Appln No. 14852699.9 dated May 26, 2017.

* cited by examiner

700

METHOD AND SYSTEM FOR SURROUND SOUND PROCESSING IN AN AUDIO DEVICE

PRIORITY CLAIM

This application is a continuation of U.S. application Ser. No. 17/123,755 filed on Dec. 12, 2020, which is a continuation of U.S. application Ser. No. 16/871,463 filed on May 11, 2020, now U.S. Pat. No. 10,880,665, which is a continuation of U.S. application Ser. No. 16/353,565 filed on Mar. 14, 2019, now U.S. Pat. No. 10,652,682, which is a continuation of U.S. patent application Ser. No. 15/659,161 filed on Jul. 25, 2017, now U.S. Pat. No. 10,237,672, which is a continuation of U.S. patent application Ser. No. 14/449,236 filed on Aug. 1, 2014, now U.S. Pat. No. 9,716,958, which claims the benefit of priority to U.S. Provisional Patent Application 61/888,586 filed on Oct. 9, 2013. The aforementioned documents are hereby incorporated herein by reference in their entirety.

TECHNICAL FIELD

Aspects of the present application relate to electronic gaming. More specifically, to methods and systems for surround sound processing in a headset.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for surround sound processing in a headset, substantially as illustrated by and/or described in connection with at least one of the figures, as set forth more completely in the claims.

DETAILED DESCRIPTION

Figure 1A:
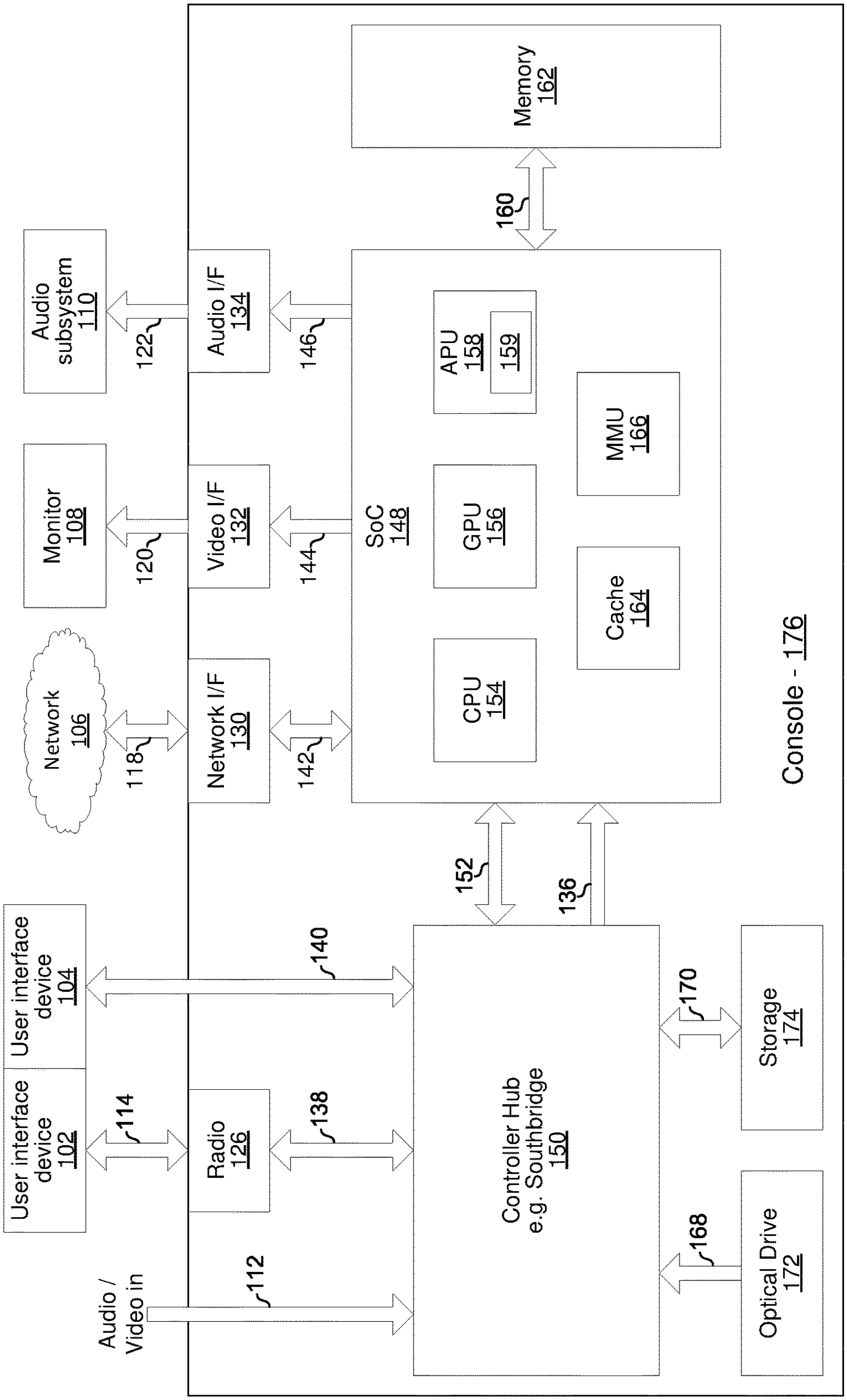
FIG. 1A is a diagram that depicts an example gaming console, which may be utilized to provide surround sound processing in a headset, in accordance with various exemplary embodiments of the disclosure.

FIG. 1A depicts an example gaming console, which may be utilized to provide surround sound processing in a headset, in accordance with various exemplary embodiment of the disclosure. Referring to FIG. 1, there is shown a console 176, user interface devices 102, 104, a monitor 108, an audio subsystem 110, and a network 106.

The game console 176 may comprise suitable logic, circuitry, interfaces and/or code that may be operable to present a game to, and also enable game play interaction between, one or more local players and/or one or more remote players. The game console 176 which may be, for example, a Windows computing device, a Unix computing device, a Linux computing device, an Apple OSX computing device, an Apple iOS computing device, an Android computing device, a Microsoft Xbox, a Sony Playstation, a Nintendo Wii, or the like. The example game console 176 comprises a radio 126, network interface 130, video interface 132, audio interface 134, controller hub 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various buses/links 136, 138, 142, 144, 146, 152, 160, 168, and 170.

The controller hub 150 comprises circuitry that supports one or more data bus protocols such as High-Definition Multimedia Interface (HDMI), Universal Serial Bus (USB), Serial Advanced Technology Attachment II, III or variants thereof (SATA II, SATA III), embedded multimedia card interface (e.MMC), Peripheral Component Interconnect Express (PCIe), or the like. The controller hub 150 may also be referred to as an input/output (I/O) controller hub. Exemplary controller hubs may comprise Southbridge, Haswell, Fusion and Sandybridge. The controller hub 150 may be operable to receive audio and/or video from an external source via link 112 (e.g., HDMI), from the optical drive (e.g., Blu-Ray) 172 via link 168 (e.g., SATA II, SATA III), and/or from storage 174 (e.g., hard drive, FLASH memory, or the like) via link 170 (e.g., SATA II, III and/or e.MMC). Digital audio and/or video is output to the SoC 148 via link 136 (e.g., CEA-861-E compliant video and IEC 61937 compliant audio). The controller hub 150 exchanges data with the radio 126 via link 138 (e.g., USB), with external devices via link 140 (e.g., USB), with the storage 174 via the link 170, and with the SoC 148 via the link 152 (e.g., PCIe).

The radio 126 may comprise suitable logic, circuitry, interfaces and/or code that may be operable to communicate in accordance with one or more wireless standards such as the IEEE 802.11 family of standards, the Bluetooth family of standards, near field communication (NFC), and/or the like.

The network interface 130 may comprise suitable logic, circuitry, interfaces and/or code that may be operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise suitable logic, circuitry, interfaces and/or code that may be operable to communicate video in accordance with one or more wired or wireless video transmission standards. For example, the video interface 132 may receive CEA-861-E compliant video data via link 144 and encapsulate/format, etc., the video data in accordance with an HDMI standard for output to the monitor 108 via an HDMI link 120.

The audio interface 134 may comprise suitable logic, circuitry, interfaces and/or code that may be operable to communicate audio in accordance with one or more wired or wireless audio transmission standards. For example, the audio interface 134 may receive CEA-861-E compliant audio data via the link 146 and encapsulate/format, etc., the video data in accordance with an HDMI standard for output to the audio subsystem 110 via an link 122.

The central processing unit (CPU) 154 may comprise suitable logic, circuitry, interfaces and/or code that may be operable to execute instructions for controlling/coordinating the overall operation of the game console 176. Such instructions may be part of an operating system of the console and/or part of one or more software applications running on the console.

The graphics processing unit (GPU) 156 may comprise suitable logic, circuitry, interfaces and/or code that may be operable to perform graphics processing functions such as compression, decompression, encoding, decoding, 3D rendering, and/or the like.

The audio processing unit (APU) 158 may comprise suitable logic, circuitry, interfaces and/or code that may be operable to perform audio processing functions such as volume/gain control, compression, decompression, encoding, decoding, surround-sound processing, and/or the like to generate one or more output audio signals (e.g., left channel and right channel signals for stereo; or front left channel, center channel, front right channel, left side channel, right side channel, left rear channel, right rear channel, and subwoofer channel signals for 7.1 surround). The APU 158 comprises memory (e.g., volatile and/or non-volatile memory) 159 which stores parameter settings to affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 may comprise suitable logic, circuitry, interfaces and/or code that may provide high-speed memory functions for use by the CPU 154, GPU 156, and/or APU 158. The cache memory 164 may typically comprise DRAM or variants thereof. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to the user interface device 102, the user interface device 104, the network 106, the monitor 108, and the audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, NFC and/or the like). The user interface device 102 may be operable to communicate with the game console 176 via the wired link 140 (e.g., USB or the like).

The network 106 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the audio subsystem 110 via link(s) 122 (e.g., S/PDIF for digital audio or "line out" for analog audio). Additional details of an example audio subsystem 110 are described below.

Figure 1B:
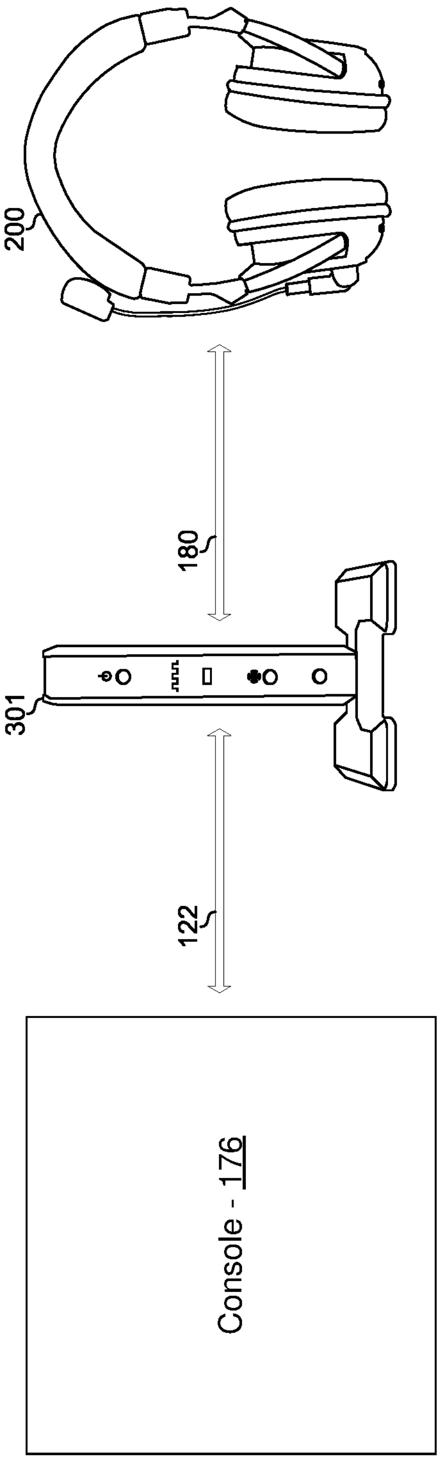
FIG. 1B is a diagram that depicts an example gaming audio subsystem comprising a headset and an audio basestation, in accordance with various exemplary embodiments of the disclosure.

FIG. 1B is a diagram that depicts an example gaming audio subsystem comprising a headset and an audio basestation, in accordance with various exemplary embodiments of the disclosure. Referring to FIG. 1B, there is shown a console 176, a headset 200 and an audio basestation 301. The headset 200 communicates with the basestation 301 via a link 180 and the basestation 301 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 301 may be as described below with reference to FIGS. 3A-3B.

Figure 1C:
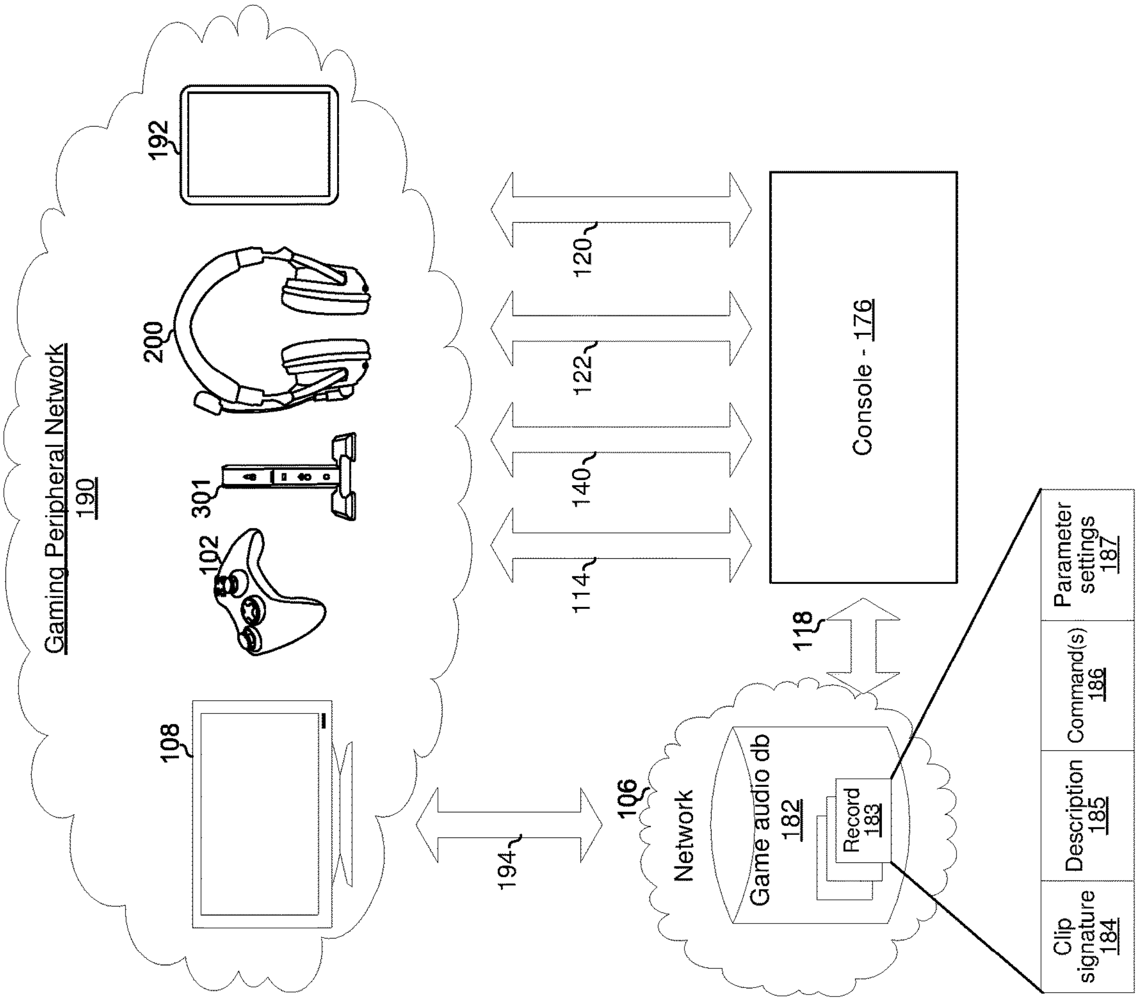
FIG. 1C is a diagram of an exemplary gaming console and an associated network of peripheral devices, in accordance with various exemplary embodiments of the disclosure.

FIG. 1C is a diagram of an exemplary gaming console and an associated network of peripheral devices, in accordance with various exemplary embodiments of the disclosure. Referring to FIG. 1C, there is shown is the console 176, which is communicatively coupled to a plurality of peripheral devices and a network 106. The example peripheral devices shown include a monitor 108, a user interface device 102, a headset 200, an audio basestation 301, and a multi-purpose device 192.

The monitor 108 and the user interface device 102 are as described above. The headset 200 is as described below with reference to FIGS. 2A-2C. The audio basestation is as described below with reference to, for example, FIGS. 3A-3B.

The multi-purpose device 192 may comprise, for example, a tablet computer, a smartphone, a laptop computer, or the like and that runs an operating system such as Android, Linux, Windows, iOS, OSX, or the like. An example multi-purpose device is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface (GUI), which may enable a user to access gaming-related data, commands, functions, parameter settings, and so on. The graphical user interface may enable a user to interact with the console 176 and the other devices of the GPN 190 to enhance the user's gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 301 in a single hop (e.g., over a proprietary RF link) and with the device 192 in a single hop (e.g., over a Bluetooth or Wi-Fi direct link), while the tablet may communicate with the basestation 301 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links and/or hops among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
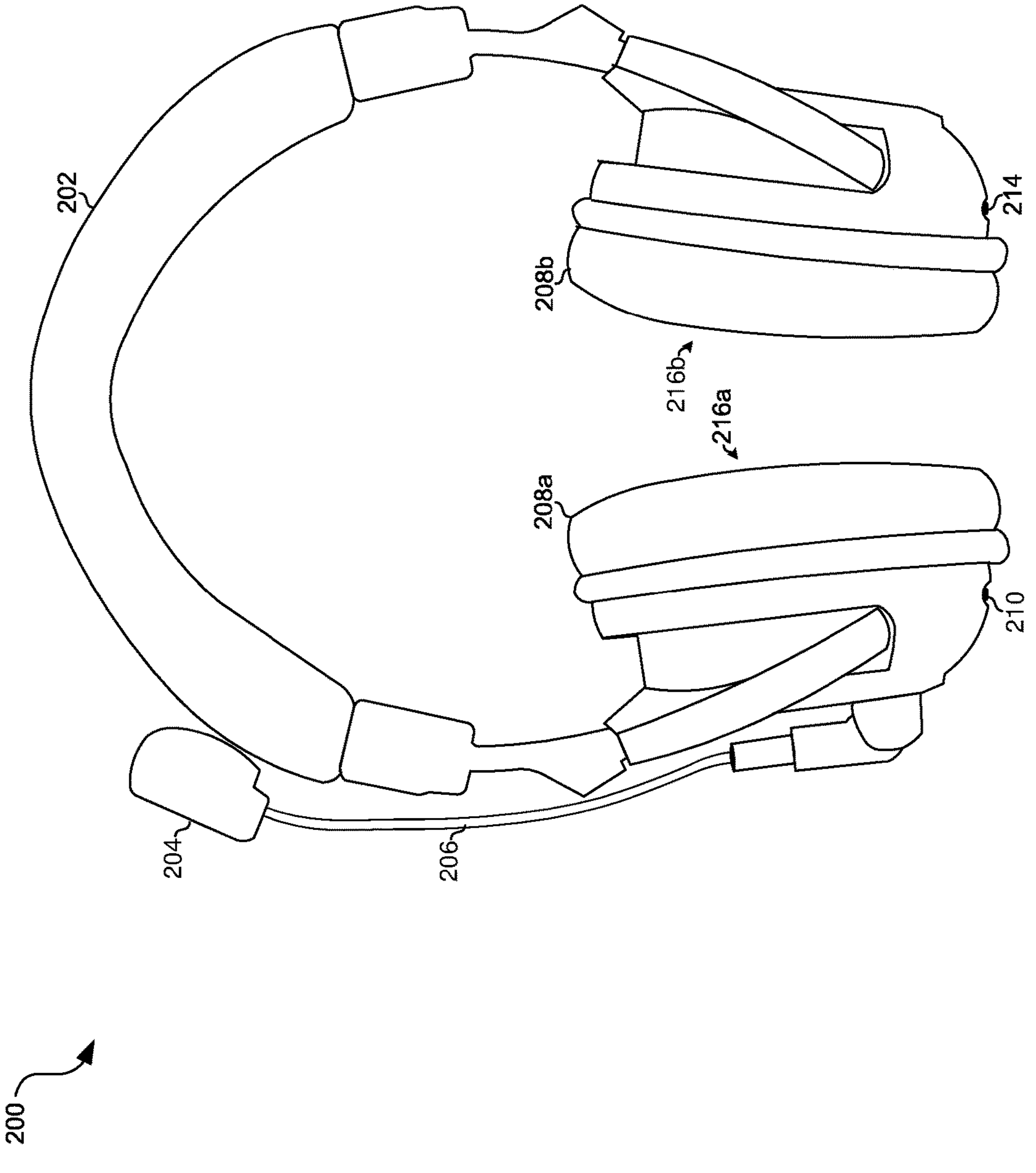
FIGS. 2A and 2B are diagrams that depict two views of an example embodiment of a gaming headset, in accordance with various exemplary embodiments of the disclosure.
Figure 2B:
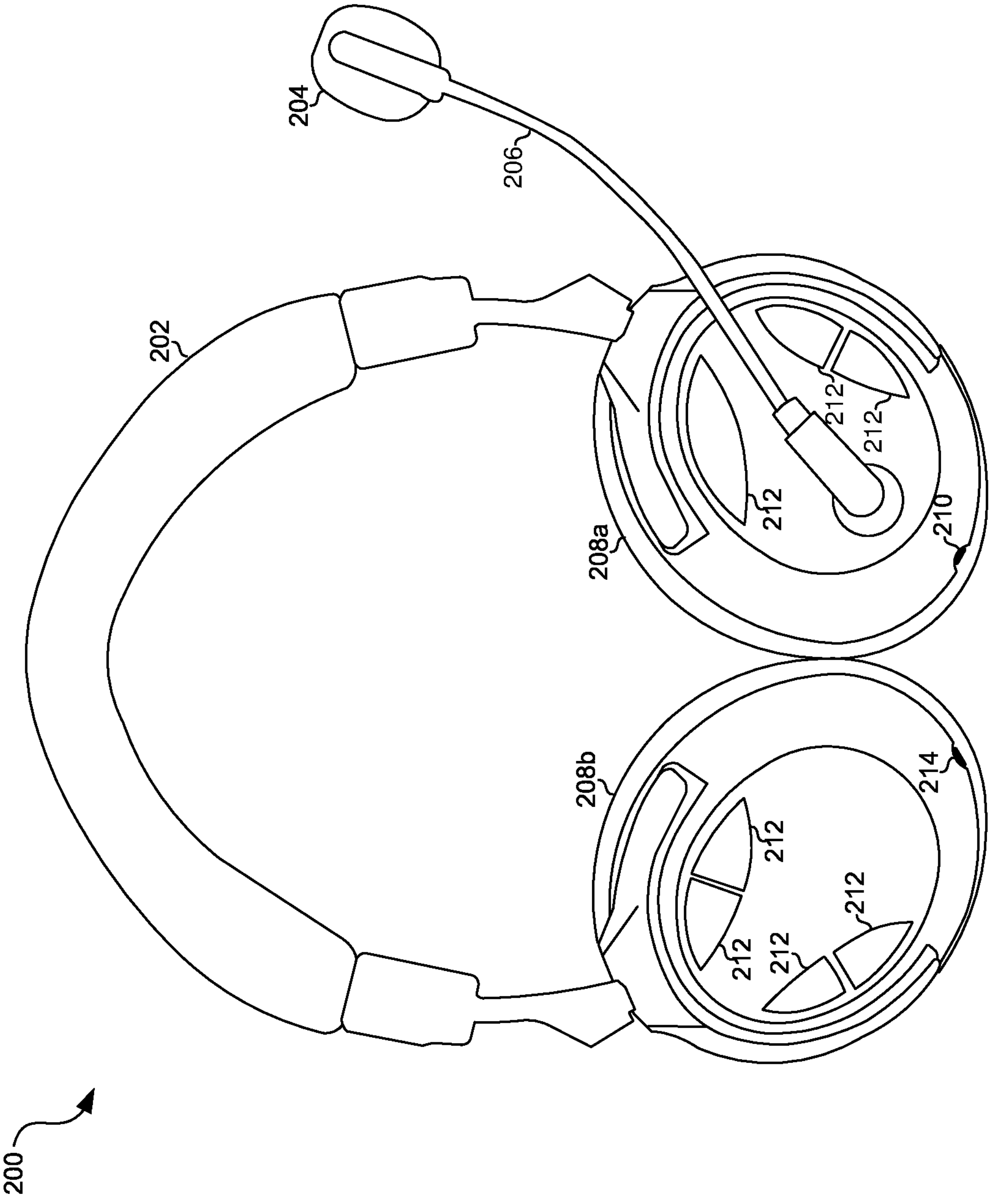

FIGS. 2A and 2B are diagrams that depict two views of an example embodiment of a gaming headset, in accordance with various exemplary embodiments of the disclosure. Referring to FIGS. 2A and 2B, there are shown two views of an example headset 200 that may present audio output by a gaming console such as the console 176. The headset 200 comprises a headband 202, a microphone boom 206 with microphone 204, ear cups 208*a* and 208*b* which surround speakers 216*a* and 216*b*, connector 210, connector 214, and user controls 212.

The connector 210 may be, for example, a 3.5 mm headphone socket for receiving analog audio signals (e.g., receiving chat audio via an Xbox "talkback" cable).

The microphone 204 may comprise suitable logic, circuitry, interfaces and/or code that may be operable to convert acoustic waves (e.g., the voice of the person wearing the headset) to electric signals for processing by circuitry of the headset and/or for output to a device (e.g., console 176, basestation 301, a smartphone, and/or the like) that is in communication with the headset.

The speakers 216*a* and 216*b* may comprise circuitry that may be operable to convert electrical signals to sound waves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, NFC, or the like) with another computing device, and/or the like. Some of the user controls 212 may adaptively and/or dynamically change during gameplay based on a particular game that is being played. Some of the user controls 212 may also adaptively and/or dynamically change during gameplay based on a particular player that is engage in the game play. The connector 214 may be, for example, a USB, thunderbolt, Firewire or other type of port or interface. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet computer, laptop computer, or the like.

Figure 2C:
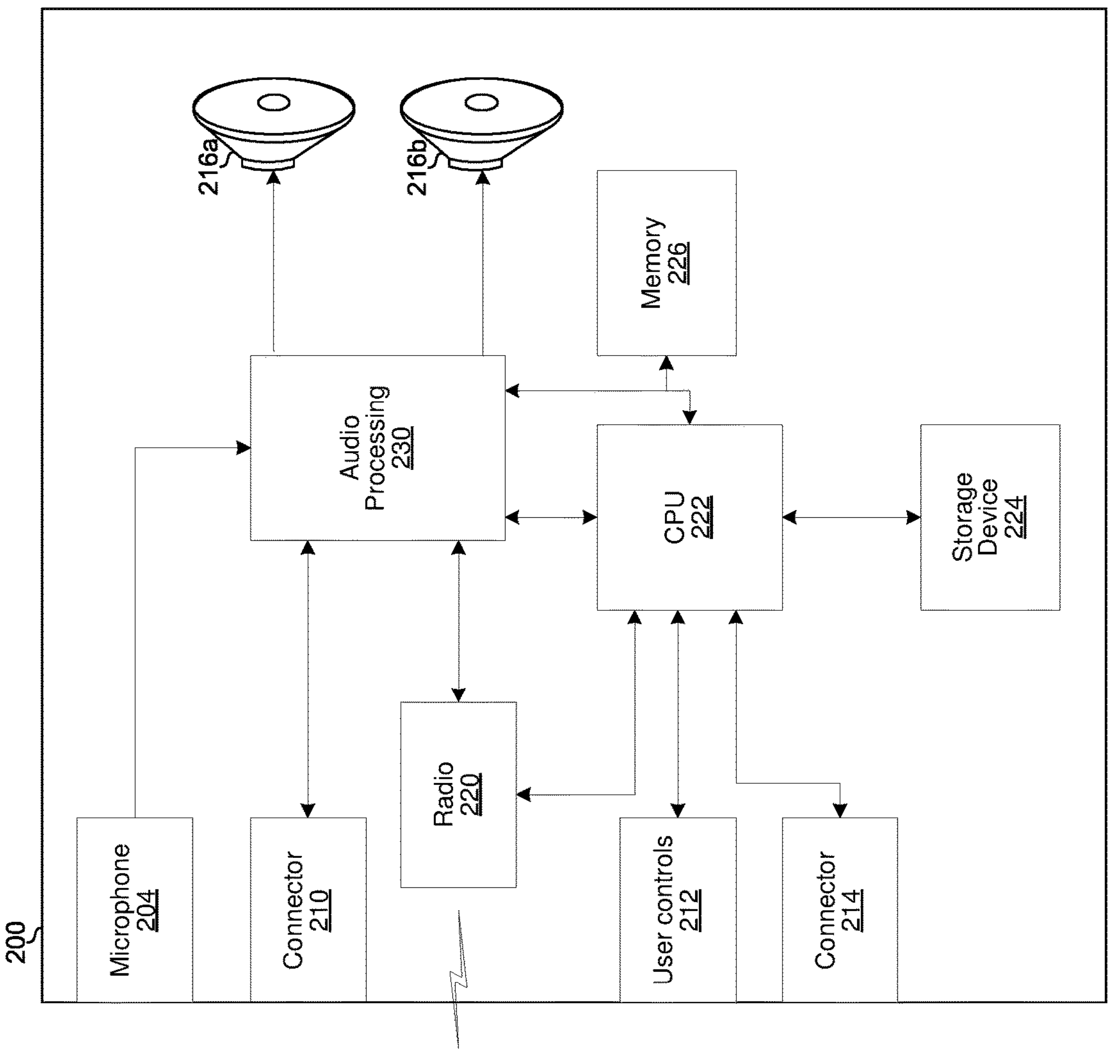
FIG. 2C is a diagram that depicts a block diagram of the example headset of FIGS. 2A and 2B, in accordance with various exemplary embodiments of the disclosure.

FIG. 2C is a diagram that depicts a block diagram of the example headset of FIGS. 2A and 2B, in accordance with various exemplary embodiments of the disclosure. Referring to FIG. 2C, there is shown a headset 200. In addition to the connector 210, user controls 212, connector 214, microphone 204, and speakers 216*a* and 216*b* already discussed, shown are a radio 220, a CPU 222, a storage device 224, a memory 226, and an audio processing circuit 230.

The radio 220 may comprise suitable logic, circuitry, interfaces and/or code that may be operable to communicate in accordance with one or more standardized (such as, for example, the IEEE 802.11 family of standards, NFC, the Bluetooth family of standards, and/or the like) and/or proprietary wireless protocol(s) (e.g., a proprietary protocol for receiving audio from an audio basestation such as the basestation 301).

The CPU 222 may comprise suitable logic, circuitry, interfaces and/or code that may be operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The CPU 222 may also be operable to handle surround sound processing of a received plurality of audio signals of a corresponding plurality of surround sound channels. In this regard, the CPU 222 may be operable to control operation of the audio processing circuit 230 in order to control and/or manage analysis of the context and the content of the audio signals received by the headset 200.

The storage device 224 may comprise suitable logic, circuitry, interfaces and/or code that may comprise, for example, FLASH or other nonvolatile memory, which may be operable to store data comprising operating data, configuration data, settings, and so on, which may be used by the CPU 222 and/or the audio processing circuit 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuit 230. As another example, one or more parameter settings may determine, at least in part, a frequency response of one or more filters that operate on audio signals in the audio processing circuit 230. As another example, one or more parameter settings may determine, at least in part, whether and which sound effects are added to audio signals in the audio processing circuit 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214.

The storage device 224 may also be operable to store information and/or data that may be utilized to analyze the context and content of received audio signals. For example, the storage device 224 may be operable to store audio information corresponding to a plurality of audio processing modes, the listener default preferences, and/or listener preferences for specific games, songs, albums, and/or movies.

In another embodiment of the disclosure, the CPU 222 may be operable to configure the audio processing circuit 230 to perform signal analysis on the audio signals received via the connector 210 and/or the radio 220. The signal analysis may be utilized to determine the content and context of the audio signals so that the audio processing circuit 230 may process the audio signals to generate output audio signals that provide a customized listening experience for the listener.

In some embodiments of the disclosure, the CPU 222 may be operable to control the operation of the audio processing circuit 230 in order to store the results of the audio analysis along with an identifier of the game in the storage device 224. For non-gaming applications where the content does not vary, for example, music and movies, the CPU 222 may be operable to store results of the audio analysis in the storage device 224 so that it may be utilized during subsequent playback. The audio analysis may be executed the first time that the game is played using the headset 200. In some embodiments of the disclosure, information related to corresponding video may also be utilized as part of the analysis of the content and context and may be stored in the storage device 224.

The memory 226 may comprise suitable logic, circuitry, interfaces and/or code that may comprise volatile memory used by the CPU 222 and/or audio processing circuit 230 as program memory, for storing runtime data, etc. In this regard, the memory 226 may comprise information and/or data that may be utilized to control operation of the audio processing circuit 230 to perform signal analysis on the plurality of received audio signals.

The audio processing circuit 230 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. For example, the audio processing circuit 230 may be operable to receive five or more signals corresponding to five or more surround channels and process (e.g., adjust amplitudes, phases, and/or other characteristics) the signals to generate a pair of virtual surround stereo signals. As described above, the processing performed by the audio processing circuit 230 may be determined, at least in part, by which parameter settings have been selected. The processing performed by the audio processing circuit 230 may also be determined based on default settings, player preference, and/or by adaptive and/or dynamic changes to the game play environment. The processing may be performed on game, chat, and/or microphone audio that is subsequently output to speaker **216*a* and 216*b*. Additionally, or alternatively, the processing may be performed on chat audio that is subsequently output to the connector 210 and/or radio 220**.

The audio processing circuit 230 may be operable to provide signal analysis on the received audio signals. In this regard, the audio processing circuit 230 may be operable to analyze the context and content of the received audio signals and process the corresponding audio signals so as to control simulated acoustic environment of a listener wearing the headset 200. The simulated acoustic environment may be characterized by, for example, perceived distances to sources of sounds in the audio signals, perceived distances to, and types of, surfaces in the simulated acoustic environment, and/or the like. For example, selection between a simulated "wooden concert hall" acoustic environment, a simulated "concrete concert hall" acoustic environment, a simulated "movie theater" acoustic environment, a simulated "playing in the band" acoustic environment, and a simulated "watching band from audience" acoustic environment may be performed based on the context and content of the audio signals. Such processing to adjust the simulated acoustic environment may comprise, for example, adjusting amplitudes, phases, delay and/or other characteristics of three or more received surround sound signals when combining the three or more signals to generate the virtual surround stereo signals. The virtual surround stereo signals may be such that, although there are only two signals and two speakers, the listener perceives three or more virtual audio channels (e.g., virtual center, virtual left front, virtual right front, virtual back left, and virtual back right).

In accordance with an embodiment of the disclosure, the audio processing circuit 230 may be operable to, for example, sample the content of the plurality of audio signals in order to determine the type of audio that is being carried by the plurality of audio signals. In an exemplary embodiment of the disclosure, the types of audio recognized by the audio processing circuitry may comprise game audio, movie audio, and music audio. In instances where the audio type comprises game audio, the audio processing circuit 230 may be operable to process the received audio signals so the virtual center channel may be perceived as being relatively close to the listener wearing the headset (e.g., right in front of the listener, who may be engaged in game play). For example, if the listener's character in the game is driving a car, the audio processing circuitry may be operable to process the received audio signals so that the engine of the car is perceived by the listener as being just in front of or behind the listener as would be the case in a real car, rather than being perceived as farther away than a car's engine could realistically be from the car's driver.

In instances where the audio type comprises movie audio, the audio processing circuit 230 may be operable to process at least a portion of the received audio signals to generate virtual surround stereo signals so that the listener perceives being surrounded by, and being in the center of, the corresponding sounds from the audio signals. For example, the audio processing circuit 230 may be operable to process the received signals to generate a virtual left side, virtual right side (RS), virtual left rear (LR), and virtual right rear (RR) audio channels that surround the listener.

In instances where the audio type comprises music audio, the audio processing circuit 230 may be operable to process the received audio signals to generate virtual surround stereo signals such that the listener perceives being part of an audience with the music originating from a stage in front of him/her, rather than perceiving the sound as if he/she is on the stage surrounded by the band. This may comprise, for example, attenuating, possibly to zero (i.e., muting), ones of the received signals corresponding to left rear and right rear audio channels for 5.1 surround, or attenuating, possibly to zero (i.e., muting), ones of the received signals corresponding to left side, left rear, right side, and right reach channels for 7.1 surround. For example, the audio processing circuit 230 may be operable to process the received audio signals to generate virtual left front, virtual center, and virtual right front that cause the listener to perceive audio as if the listener were in the audience watching a band on stage.

In accordance with an embodiment of the disclosure, the listener may have the capability to select the type of audio and/or the desired simulated acoustic environment. In some embodiments of the disclosure, the type of audio may be automatically detected and/or the best-suited simulated acoustic environment may be automatically selected by the audio processing circuit 230 and the CPU 222 based on, for example, listener preferences stored in memory, the state of the in-game environment, and so on. The state of the in-game environment may include, for example, the current scenario taking place in the game (e.g., what level the player is on; whether the player's character is walking, driving, fighting, talking, driving, etc.; and/or what the player's character is carrying, using, etc.), a current character being used by the player (e.g., man or woman character, tall or short character, etc.), the current viewpoint the player is using (e.g., first-person, third-person, or bird's-eye), and/or the like. In some embodiments of the disclosure, changes in the type of audio may be detected in or near real-time. In some embodiments of the disclosure, the selected simulated acoustic environment may adapt/change, in or near real-time, by the audio processing circuit 230 and the CPU 222 based on, for example, listener preferences stored in memory, the state of an environment in which the sound is generated, and so on in order to provide optimal user experience. Adaptive changes may occur in response to changes such as scenarios that take place or game features that may be unlocked or achieved during the game play.

In accordance with an embodiment of the disclosure, the audio processing circuit 230 and the CPU 222 may be operable to analyze the content carried by the plurality of audio signals in order to determine the best-suited simulated acoustic environment. For example, at a first time instant, t1, it may be determined that a first sound occurring in the received audio signals should be perceived as being closer to the listener while a second sound occurring in the received audio signals is perceived as being further away from the listener. In a subsequent time instant, t2, it may be determined that the second sound should be perceived as being close to the listener while the first sound is perceived as being further away from the listener. Accordingly, perceived distance of the listener to the source of the first sound and the second sound may be dynamically and/or adaptively moved in real-time. The audio processing circuit 230 may be operable to process and dynamically and/or adaptively adjust at least a portion of the plurality of audio signals channels to provide the desired or optimal simulated acoustic environment. In various embodiments of the disclosure, the audio processing circuit 230 may be operable to adjust the amplitude, phase, and/or other characteristics of selective ones of the received audio signals (e.g., received via connector 210 and/or radio 220) to provide the desired or optimal listener perception. For example, characteristics of the signals may be adjusted such that the virtual center channel may be moved close to the listener when a particular sound is present and moved further away from the listen when the particular sound is not present.

In accordance with an embodiment of the disclosure, the audio processing circuit 230 and the CPU 222 may be operable to sample the content carried by the plurality of audio signals in order to determine the state of the in-game environment. Once the state of the in-game environment is determined, the audio processing circuit 230 may be operable to selectively adjust levels, phase, and/or other characteristics one or more of the plurality of audio signals to provide the desired or optimal simulated location of the listener relative to various sounds present in the audio.

The audio processing circuit 230 and the CPU 222 may be operable to determine when, for example, the listener/player is utilizing a particular view. Whenever the particular view is detected, the audio processing circuit 230 and the CPU 222 may be operable to dynamically and/or adaptively adjust one or more virtual surround channels to provide the desired or optimal listener perception. For example, in instances when the listener/player is in a first-person view, the audio processing circuit 230 and the CPU 222 may be operable to detect the first person view and adjust the virtual center channel so that the listener perceives the sounds on the virtual center channel as being relatively close to him/her. In instances when the listener/player, is in a bird's eye view, the audio processing circuit 230 and the CPU 222 may be operable to detect the bird's eye view and adjust the virtual center channel so that the listener perceives the sounds on the virtual center channel as being relatively far from him/her.

In accordance with some embodiments of the disclosure, the context, may be determined based on metadata that may be extracted from the one or more of the plurality of audio signals. The context may include, for example, type of audio, state of the in-game environment, and/or the content of the audio. In this regard, the audio processing circuit 230 and the CPU 222 may be operable to inspect or examine the content carried by the one or more of the plurality of audio signals in order to determine the corresponding metadata.

In accordance with some embodiments of the disclosure, audio information or data corresponding to the context including the type of audio, and/or the state of the in-game environment, and the content of the audio, may be acquired from a database or information that may be stored in the storage device 224 or memory 226. The audio information or data corresponding to the context and/or content of the audio, may be loaded when for example, game play is initiated, a movie is started or a song or album is played. The CPU 222 may be operable to acquire the stored audio information for a particular game, movie, song or album from the storage device 224. In this regard, the CPU 222 may be operable to detect or determine the identity of the game, movie, song or album and acquire or load the corresponding stored audio information from the storage device 224 and/or the memory 226.

Figure 3A:
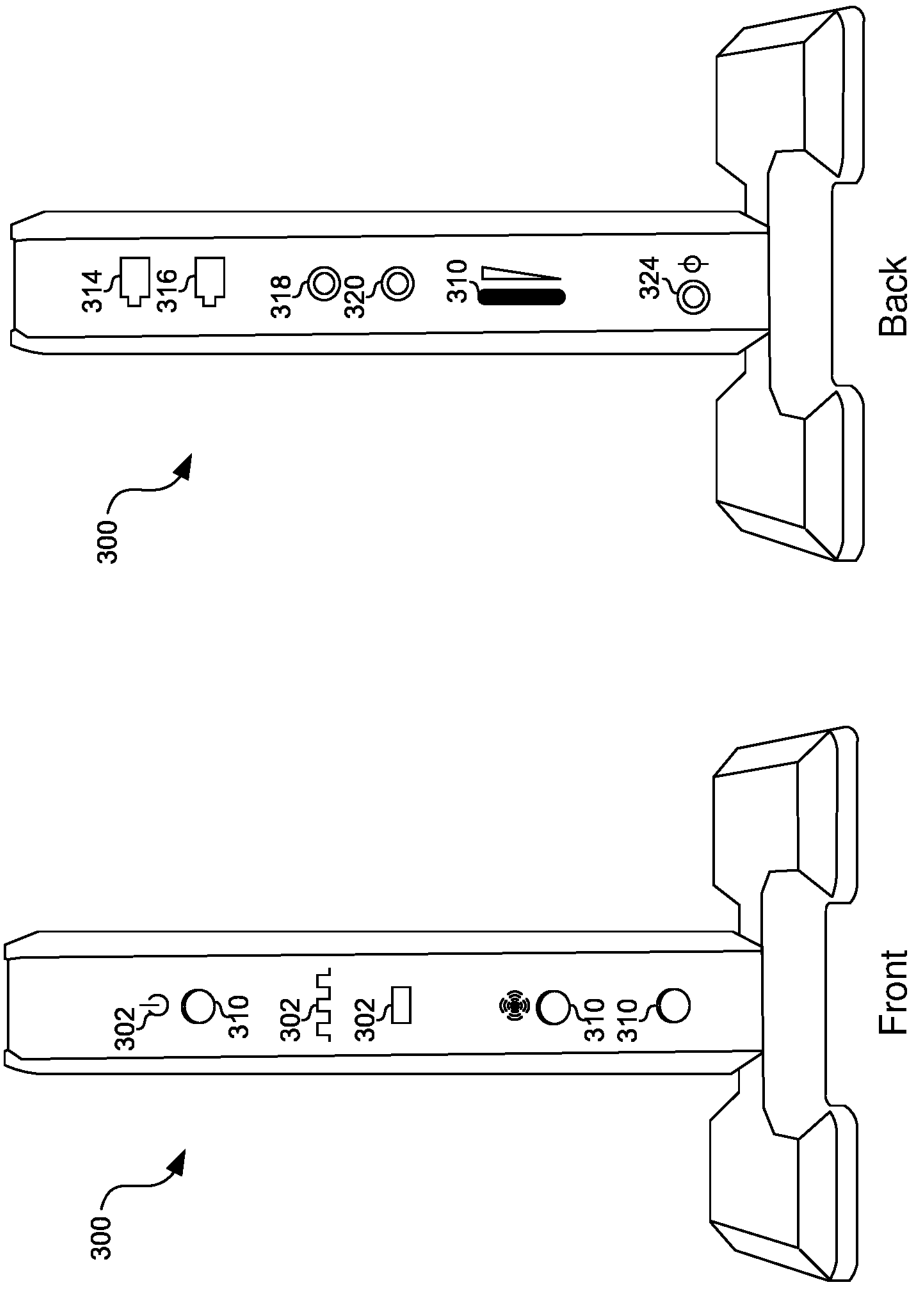
FIG. 3A is a diagram that depicts two views of an example embodiment of an audio basestation, in accordance with various exemplary embodiments of the disclosure.

FIG. 3A is a diagram that depicts two views of an example embodiment of an audio basestation, in accordance with various exemplary embodiments of the disclosure. Referring to FIG. 3A, there is shown an exemplary embodiment of an audio basestation 301. The basestation 301 comprises status indicators 302, user controls 310, power port 324, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles/locations of the speakers when the virtual surround sound is enabled, and a dial for controlling a volume/gain of the audio received via the "line in" connectors 318 and 320. The status indicators 302 may indicate, for example, whether the audio basestation 301 is powered on, whether audio data is being received by the basestation 301 via connectors 314, and/or what class of audio data (e.g., Dolby Digital) is being received by the basestation 301.

Figure 3B:
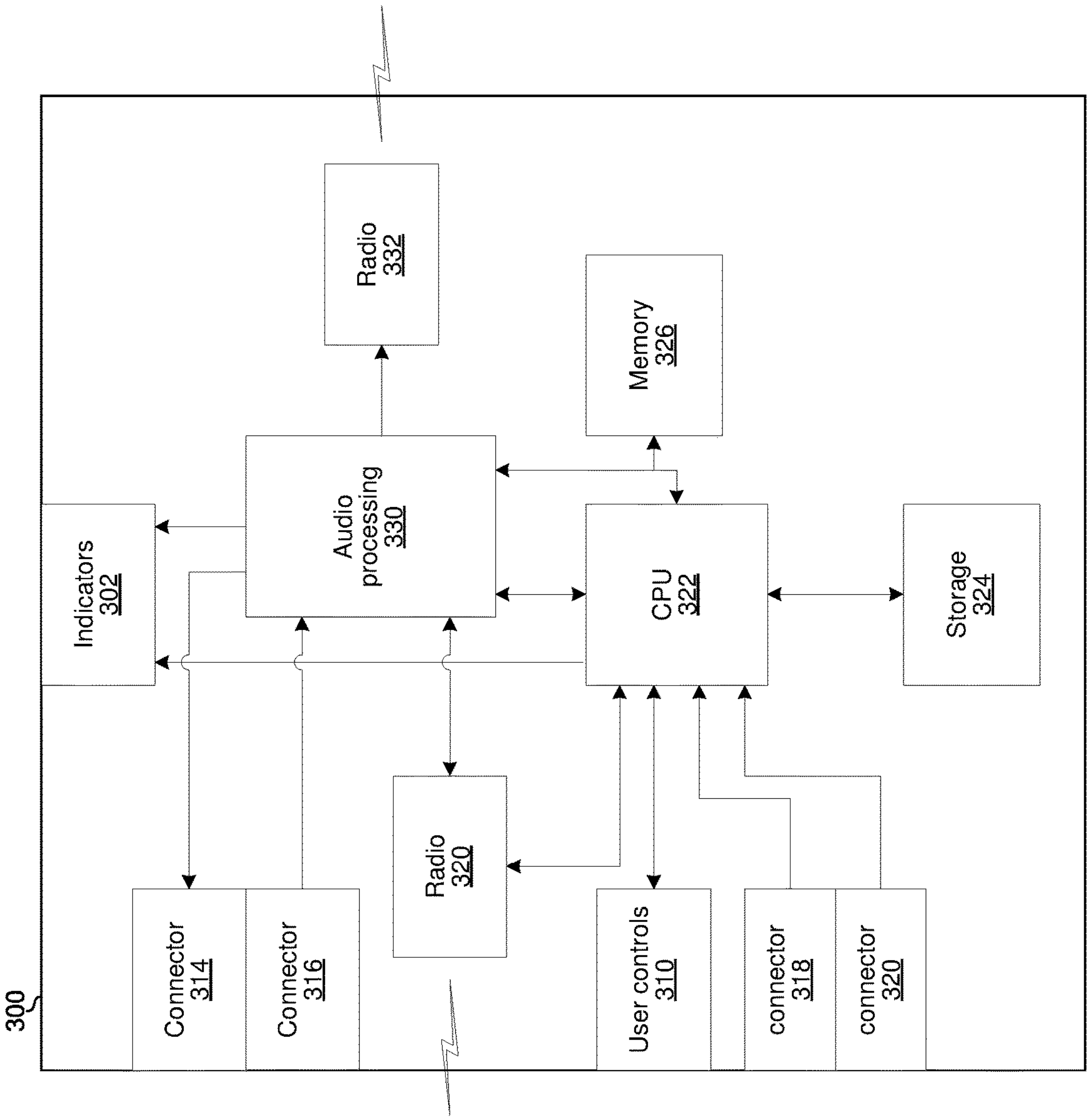
FIG. 3B is a diagram that depicts a block diagram of the audio basestation, in accordance with various exemplary embodiments of the disclosure.

FIG. 3B is a diagram that depicts a block diagram of the audio basestation 301, in accordance with various exemplary embodiments of the disclosure. Referring to FIG. 3B, there is shown an exemplary embodiment of an audio basestation 301. In addition to the user controls 310, indicators 302, and connectors 314, 316, 318, and 320 described above, the block diagram additionally shows a CPU 322, a storage device 324, a memory 326, a radio 320, an audio processing circuit 330, and a radio 332.

The radio 320 comprises suitable logic, circuitry, interfaces and/or code that may be operable to communicate in accordance with one or more standardized (such as the IEEE 802.11 family of standards, the Bluetooth family of standards, NFC, and/or the like) and/or proprietary (e.g., proprietary protocol for receiving audio protocols for receiving audio from a console such as the console 176) wireless protocols.

The radio 332 comprises suitable logic, circuitry, interfaces and/or code that may be operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to the headphones 200).

The CPU 322 comprises suitable logic, circuitry, interfaces and/or code that may be operable to execute instructions for controlling/coordinating the overall operation of the audio basestation 301. Such instructions may be part of an operating system or state machine of the audio basestation 301 and/or part of one or more software applications running on the audio basestation 301. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuit 330. Such data may include, for example, parameter settings that affect processing of audio signals in the basestation 301. For example, one or more parameter settings may determine, at least in part, a gain of one or more gain elements of the audio processing circuit 330. As another example, one or more parameter settings may determine, at least in part, a frequency response of one or more filters that operate on audio signals in the audio processing circuit 330. As another example, one or more parameter settings may determine, at least in part, whether and which sound effects are added to audio signals in the audio processing circuit 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 301 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise suitable logic, circuitry, interfaces and/or code that may be operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 301. Additionally, or alternatively, the processing may be performed on a microphone audio signal that is subsequently output to a device (e.g., console 176) in communication with the basestation 301.

Figure 4:
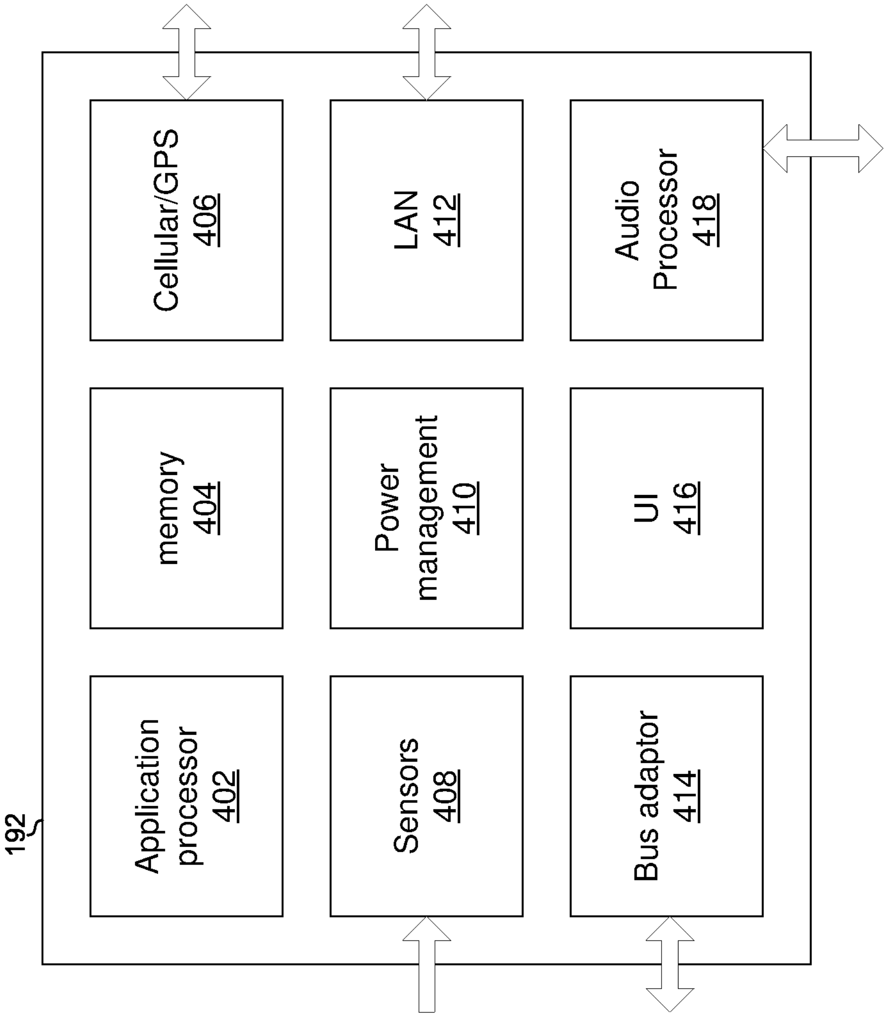
FIG. 4 is a block diagram of an exemplary multi-purpose device, in accordance with various exemplary embodiments of the disclosure.

FIG. 4 is a block diagram of an exemplary multi-purpose device 192, in accordance with various exemplary embodiments of the disclosure. The example multi-purpose device 192 comprises an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises suitable logic, circuitry, interfaces and/or code that may be operable to execute instructions for controlling/coordinating the overall operation of the multi-purpose device 192 as well as graphics processing functions of the multi-purpose device 192. Such instructions may be part of an operating system of the console and/or part of one or more software applications running on the console.

The memory subsystem 404 comprises volatile memory for storing runtime data, nonvolatile memory for mass storage and long-term storage, and/or a memory controller which controls reads/writes to memory.

The cellular/GPS networking subsystem 406 comprises suitable logic, circuitry, interfaces and/or code that may be operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises suitable logic, circuitry, interfaces and/or code that may be operable to manage distribution of power among the various components of the multi-purpose device 192.

The LAN subsystem 412 comprises suitable logic, circuitry, interfaces and/or code that may be operable to perform baseband processing and analog/RF processing for transmission and reception of cellular and GPS signals.

The bus adaptor 414 comprises suitable logic, circuitry, interfaces and/or code that may be operable for interfacing one or more internal data busses of the multi-purpose device with an external bus (e.g., a Universal Serial Bus) for transferring data to/from the multi-purpose device via a wired connection.

The user interface subsystem 416 comprises suitable logic, circuitry, interfaces and/or code that may be operable to control and relay signals to/from a touchscreen, hard buttons, and/or other input devices of the multi-purpose device 192.

The audio processor 418 comprises suitable logic, circuitry, interfaces and/or code that may be operable to process (e.g., digital-to-analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
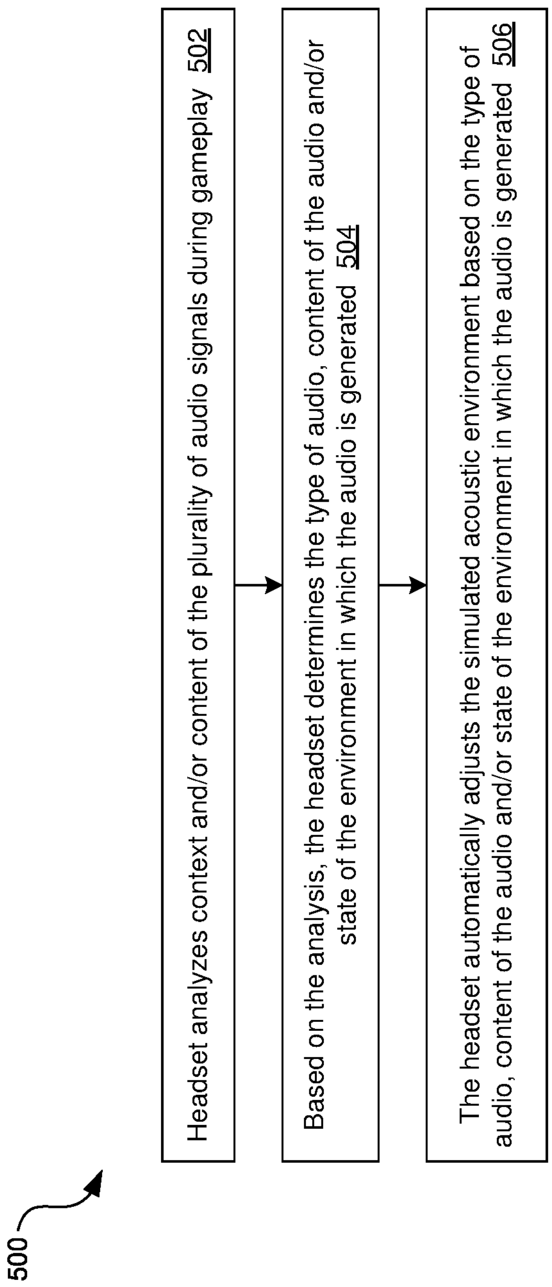
FIG. 5 is a flow diagram illustrating exemplary steps for providing surround sound processing in a headset, in accordance with various exemplary embodiments of the disclosure.

FIG. 5 is a flow diagram illustrating exemplary steps for providing surround sound processing in a headset, in accordance with various exemplary embodiments of the disclosure. Referring to FIG. 5, there is shown a flow chart 500 comprising a plurality of exemplary steps, namely, 502 through 506. In step 502, the headset analyzes context and/or content of a plurality of received audio signals (e.g., received via connector 210 and/or radio 220). In step 504, based on the analysis, the headset determines the type of audio, content of the audio and/or state of the in-game environment. In step 506, the headset automatically adjusts the simulated acoustic environment based on the type of audio, content of the audio and/or state of in-game environment.

Figure 6:
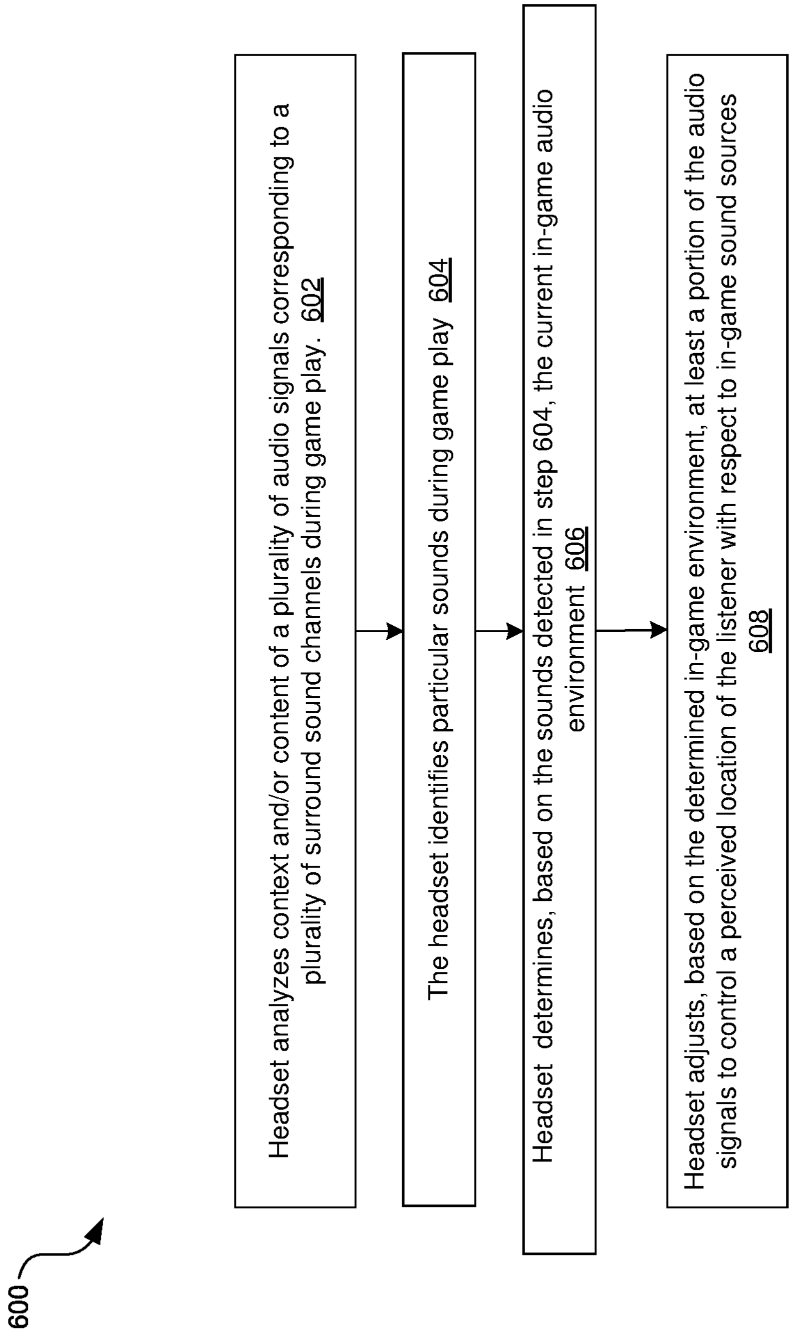
FIG. 6 is a flow diagram illustrating exemplary steps for providing surround sound processing in a headset, in accordance with various exemplary embodiments of the disclosure.

FIG. 6 is a flow diagram illustrating exemplary steps for providing surround sound processing in a headset, in accordance with various exemplary embodiments of the disclosure. Referring to FIG. 6, there is shown a flow chart 600 comprising a plurality of exemplary steps, namely, 602 through 608. In step 602, the headset analyzes context and/or content of a plurality of audio signals corresponding to a plurality of surround sound channels during game play. In step 604, the headset identifies particular sounds in the received audio signals. The particular sounds may correspond to, for example: game sounds generated in response to particular player input(s), via a user interface device 102; game sounds corresponding to particular levels or scenarios of a particular game; game sounds corresponding to particular actions (e.g., character movements) taking place within a particular game; recognized voice commands in microphone audio of the headset; and/or the like. In step 606, the headset determines, based on the sounds detected in step 604, the current in-game audio environment. In step 608, the headset adjusts, based on the determined in-game environment, at least a portion of the audio signals to control a perceived location of the listener with respect to in-game sound sources. For example, in response to detecting that the player/listener is currently using a first-person view, the virtual center channel may be controlled to be perceived as relatively close to the listener/player, and in response to detecting that the player/istener is currently using a bird's eye view, the virtual center channel may be controlled to be perceived as relatively far from the listener/player.

Figure 7:
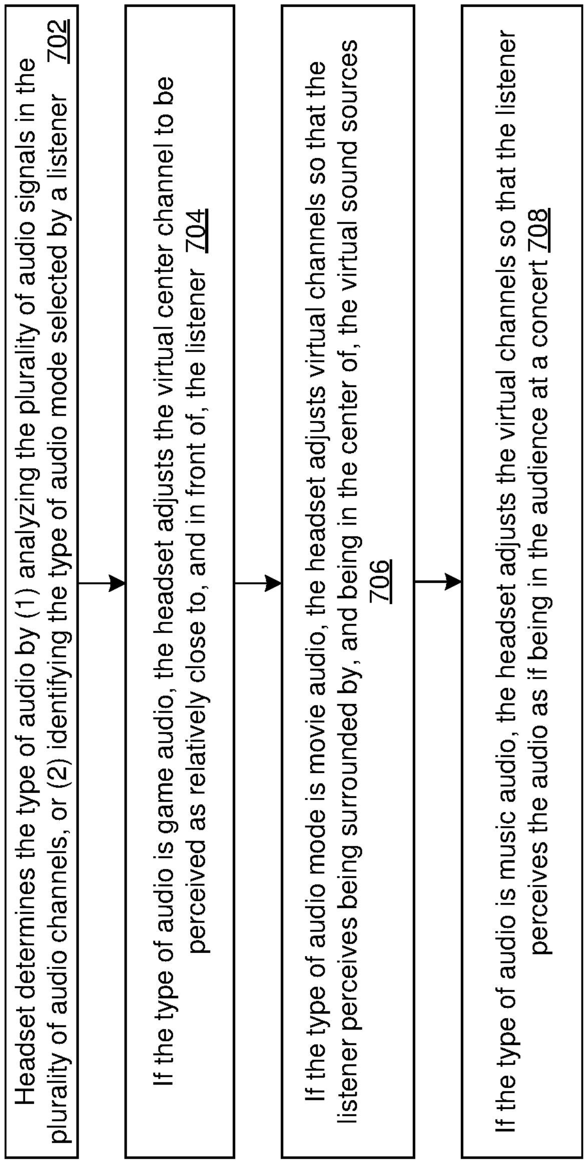
FIG. 7 is a flow diagram illustrating exemplary steps for providing surround sound processing in a headset, in accordance with various exemplary embodiments of the disclosure.

FIG. 7 is a flow diagram illustrating exemplary steps for providing surround sound processing in a headset, in accordance with various exemplary embodiments of the disclosure. Referring to FIG. 7, there is shown a flow chart 700 comprising a plurality of exemplary steps, namely, 702 through 708. In step 702, the headset determines the type of audio by (1) analyzing the plurality of audio signals in the plurality of audio channels, or (2) identifying the type of audio mode selected by a listener. In step 704, if the type of audio is game audio, the headset adjusts the simulated acoustic environment such that the virtual center channel is perceived as relatively close to, and in front of, the listener. In step 706, if the type of audio mode is movie audio, the headset adjusts the simulated acoustic environment such that the listener perceives that s/he is surrounded by the sources of sounds in the movie audio. In step 708, if the type of audio is music audio, the headset adjusts the simulated acoustic environment such that the listener perceives the various sources of sounds (e.g., various instruments) as being on a stage in front of him/her as opposed to perceiving the audio as if being a participant of the band playing the music with the instruments all around him/her.

In accordance with an exemplary embodiment of the disclosure, an audio headset 200 may receive a plurality of audio signals corresponding to plurality of surround sound channels (e.g., right-front, left-front, center, left-side, right-side, left-rear, and right-rear). The headset may determine, via audio processing circuitry (e.g., 330), context and content of the audio signals. The audio processing circuitry may process the audio signals to generate a pair of stereo signals carrying one or more virtual surround channels, wherein the processing comprises automatically controlling, based on the context and the content of the audio signals, a simulated acoustic environment of the virtual surround channels. The determining the context of the audio signals may comprise determining whether a type of audio carried by the audio signals is game audio, music audio, or movie audio. When the audio carried by the audio signals is game audio the audio processing circuitry may automatically (e.g., without requiring user intervention) select a first simulated acoustic environment. When the audio carried by the audio signals is music audio the audio processing circuitry may automatically select a second simulated acoustic environment. When the audio carried by the audio signals is movie audio the audio processing circuitry may automatically select a third simulated acoustic environment. When the type of the audio is music audio, the audio processing circuitry may attenuate side audio and rear audio channels of the plurality of surround sound channels. The determining of the context of the audio signals may comprise the audio processing circuitry determining a scenario taking place in the game that is generating the game audio. The determining the context of the audio signals may comprise the audio processing circuitry determining a viewpoint being used in the game that is generating the game audio. The controlling the simulated acoustic environment may comprises the audio processing circuitry selecting between a first simulated acoustic environment and a second simulated acoustic environment where, for the first simulated acoustic environment, the processing may be such that a listener would perceive a source of one of the virtual surround channels (e.g., the center channel) as being relatively close, and, for the second simulated acoustic environment, the processing may be such that a listener would perceive a source of one of the virtual surround channels as being relatively far. The determining the content may comprise: detecting a particular sound within the audio signals, and searching a data structure (e.g., database 182) for a record corresponding to the particular sound.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Throughout this disclosure, the use of the terms dynamically and/or adaptively with respect to an operation means that, for example, parameters for, configurations for and/or execution of the operation may be configured or reconfigured during run-time (e.g., in, or near, real-time) based on newly received or updated information or data. For example, an operation within a transmitter and/or a receiver may be configured or reconfigured based on, for example, current, recently received and/or updated signals, information and/or data.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A method, comprising:

in an audio device:

receiving a plurality of audio channels;

determining an acoustic environment according to a type of audio carried by the audio channels;

simulating the acoustic environment via one or more virtual channels; and generating stereo signals according to the one or more virtual channels.

2. The method of claim 1, wherein the type of audio comprises one of game audio, music audio and movie audio.

3. The method of claim 1, wherein when the type of audio is game audio, the acoustic environment is different than when the type of audio is music audio.

4. The method of claim 1, wherein when the type of audio is game audio, the acoustic environment is different than when the type of audio is movie audio.

5. The method of claim 1, wherein when the type of audio is movie audio, the acoustic environment is different than when the type of audio is music audio.

6. The method of claim 1, wherein when the type of the audio is music audio, side audio channels and rear audio channels, of the plurality of audio channels, are attenuated.

7. The method of claim 1, wherein when the type of the audio is game audio, the acoustic environment comprises a scenario in a game that is generating the game audio.

8. The method of claim 1, wherein when the type of the audio is game audio, the acoustic environment comprises a viewpoint of a player in a game that is generating the game audio.

9. The method of claim 1, wherein in a first acoustic environment, a listener perceives a source of one of the virtual channels as being closer, relative to a second acoustic environment.

10. The method of claim 1, wherein the virtual channels comprise a center channel.

11. The method of claim 1, wherein the method comprises:

detecting the type of audio, carried by the audio channels, according to a particular sound stored in the audio device.

12. A system, comprising:

an audio device configured to:

receive a plurality of audio channels;

determine an acoustic environment according to a type of audio carried by the audio channels;

simulate the acoustic environment via one or more virtual channels; and generate stereo signals according to the one or more virtual channels.

13. The system of claim 12, wherein the type of audio comprises one of game audio, music audio and movie audio.

14. The system of claim 12, wherein when the type of audio is game audio, the audio device is configured to simulate a different acoustic environment than when the type of audio is music audio.

15. The system of claim 12, wherein when the type of audio is game audio, the audio device is configured to simulate a different acoustic environment than when the type of audio is movie audio.

16. The system of claim 12, wherein when the type of audio is movie audio, the audio device is configured to simulate a different acoustic environment than when the type of audio is music audio.

17. The system of claim 12, wherein when the type of the audio is music audio, the audio device is configured to attenuate side audio channels and rear audio channels, of the plurality of audio channels.

18. The system of claim 12, wherein when the type of the audio is game audio, the audio device is configured to simulate the acoustic environment according to a scenario in a game that is generating the game audio.

19. The system of claim 12, wherein when the type of the audio is game audio, the audio device is configured to simulate the acoustic environment from a viewpoint of a player in a game that is generating the game audio.

20. The system of claim 12, wherein the audio device is configured to simulate a first acoustic environment such that a listener perceives a source of one of the virtual channels as being closer, relative to a second acoustic environment.

21. The system of claim 12, wherein the virtual channels comprise a center channel.

22. The system of claim 12, wherein the audio device is configured to:

detect the type of audio, carried by the audio channels, according to a particular sound stored in the audio device.

* * * * *